US011791868B2

(12) United States Patent
Kulkarni et al.

(10) Patent No.: US 11,791,868 B2
(45) Date of Patent: Oct. 17, 2023

(54) ENHANCING RADIO RESOURCE MANAGEMENT WITH BEAMWIDTH SELECTION AND BEAMSTEERING

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 17/451,527

(22) Filed: Oct. 20, 2021

(65) Prior Publication Data

US 2023/0119710 A1 Apr. 20, 2023

(51) Int. Cl.
*H04B 7/0426* (2017.01)
*H04W 16/10* (2009.01)
*H04W 48/16* (2009.01)
*H04B 17/318* (2015.01)

(52) U.S. Cl.
CPC ............ *H04B 7/043* (2013.01); *H04W 16/10* (2013.01); *H04W 48/16* (2013.01); *H04B 17/318* (2015.01)

(58) Field of Classification Search
CPC ..... H04B 7/043; H04B 17/318; H04W 16/10; H04W 48/16
See application file for complete search history.

(56) References Cited

U.S. PATENT DOCUMENTS

| 6,504,517 | B1 | 1/2003 | Liu et al. |
| 6,738,019 | B1 | 5/2004 | Luz et al. |
| 9,479,241 | B2 | 10/2016 | Pabla |
| 10,129,887 | B2 | 11/2018 | Pabla |
| 10,804,981 | B1* | 10/2020 | Marupaduga ........ H04B 7/0689 |
| 11,024,961 | B2 | 6/2021 | Anderson et al. |
| 2003/0164791 | A1 | 9/2003 | Shinoda et al. |
| 2004/0157645 | A1 | 8/2004 | Smith et al. |
| 2014/0029450 | A1 | 1/2014 | Vitek |
| 2014/0210666 | A1 | 7/2014 | Maltsev et al. |
| 2014/0269491 | A1* | 9/2014 | Edge ..................... H04W 48/16 370/328 |

(Continued)

OTHER PUBLICATIONS

Cisco.com, "Coverage Hole Detection and Mitigation Algorithm," Radio Resource Management White Paper, pp. 1-4, Accessed: Oct. 26, 2021.

(Continued)

*Primary Examiner* — Jean B Corrielus
(74) *Attorney, Agent, or Firm* — Patterson + Sheridan, LLP

(57) ABSTRACT

An operator may enhance radio resource management with beamwidth selection and beamsteering by receiving coverage data for a plurality of access points (APs) in a wireless network; calculating an antenna arrangement for the plurality of APs based on the coverage data, wherein the antenna arrangement covers a designated area in an environment; and configuring each AP of the plurality of aps according to the antenna arrangement by: setting a steering angle for adjustable antennas of the plurality of APs, setting a transmission power for the adjustable antennas; and setting a beamwidth of the adjustable antennas.

20 Claims, 15 Drawing Sheets

(56) References Cited

U.S. PATENT DOCUMENTS

| | | |
|---|---|---|
| 2015/0264584 A1 | 9/2015 | Dayanandan et al. |
| 2016/0127089 A1 | 5/2016 | Haghighat et al. |
| 2016/0330643 A1 | 11/2016 | Sahin et al. |
| 2017/0324439 A1 | 11/2017 | Desai et al. |
| 2017/0374663 A1 | 12/2017 | Lee et al. |
| 2019/0222279 A1 | 7/2019 | Xi et al. |
| 2020/0128386 A1 | 4/2020 | Abdallah et al. |
| 2020/0395664 A1 | 12/2020 | Athley et al. |
| 2021/0135359 A1 | 5/2021 | Anderson et al. |

OTHER PUBLICATIONS

PCT Notification of Transmittal of the International Search Report and the Written Opinion of the International Searching Authority, or the Declaration for Application PCT/US2020/057947 dated Jan. 21, 2021.

* cited by examiner

ENHANCING RADIO RESOURCE MANAGEMENT WITH BEAMWIDTH SELECTION AND BEAMSTEERING

TECHNICAL FIELD

Embodiments presented in this disclosure generally relate to wireless network managed. More specifically, embodiments disclosed herein discuss managing radios with multiple different beamwidth configurations.

BACKGROUND

Wireless Local Area Networks (WLAN) have soared in popularity due to the functionalities provided thereby and the ease of deployment. Accordingly, ever greater numbers of Access Points (APs) are deployed by a growing number of controlling entities. However, as bandwidth is limited, the increasing proximity of competing networks can lead to congestion or internetwork interference when coverage ranges overlap one another.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method, including: receiving coverage data for a plurality of Access Points (APs) in a wireless network; calculating an antenna arrangement for the plurality of APs based on the coverage data, wherein the antenna arrangement covers a designated area in an environment; and configuring each AP of the plurality of APs according to the antenna arrangement by: setting a steering angle for adjustable antennas of the plurality of APs; setting a transmission power for the adjustable antennas; and setting a beamwidth of the adjustable antennas.

One embodiment presented in this disclosure provides a system, including: a processor; and a memory storing instructions that when executed by the processor cause the processor to perform operations comprising: receiving coverage data for a plurality of Access Points (APs) in a wireless network; calculating an antenna arrangement for the plurality of APs based on the coverage data, wherein the antenna arrangement covers a designated area in an environment; and configuring each AP of the plurality of APs according to the antenna arrangement by: setting a steering angle for adjustable antennas of the plurality of APs; setting a transmission power for the adjustable antennas; and setting a beamwidth of the adjustable antennas.

One embodiment presented in this disclosure provides a non-transitory computer readable storage medium including instructions that when executed by a processor cause the processor to perform operations including: receiving coverage data for a plurality of Access Points (APs) in a wireless network; calculating an antenna arrangement for the plurality of APs based on the coverage data, wherein the antenna arrangement covers a designated area in an environment; and configuring each AP of the plurality of APs according to the antenna arrangement by: setting a steering angle for adjustable antennas of the plurality of APs; setting a transmission power for the adjustable antennas; and setting a beamwidth of the adjustable antennas.

Example Embodiments

The present disclosure provides enhancements for radio resource management schemes when one or more radios offer selectable beamwidth configurations, beam steering, and combinations thereof. The present disclosure expands the functionality of the network controllers to handle programmable multi-antenna Access Points (APs) that are included in a network deployment to steer the antennas or adjust the beamwidth thereof. The network controller can thereby reinforce coverage patterns in a particular direction and suppress the coverage patterns in undesired directions by managing programmable multi-antenna APs to control the direction of signal broadcasts. Accordingly, the network controller can reduce the overall transmission power for the wireless network to below previously recommended power levels while maintaining or improving network coverage compared to higher-powered network deployments.

Figure 1:
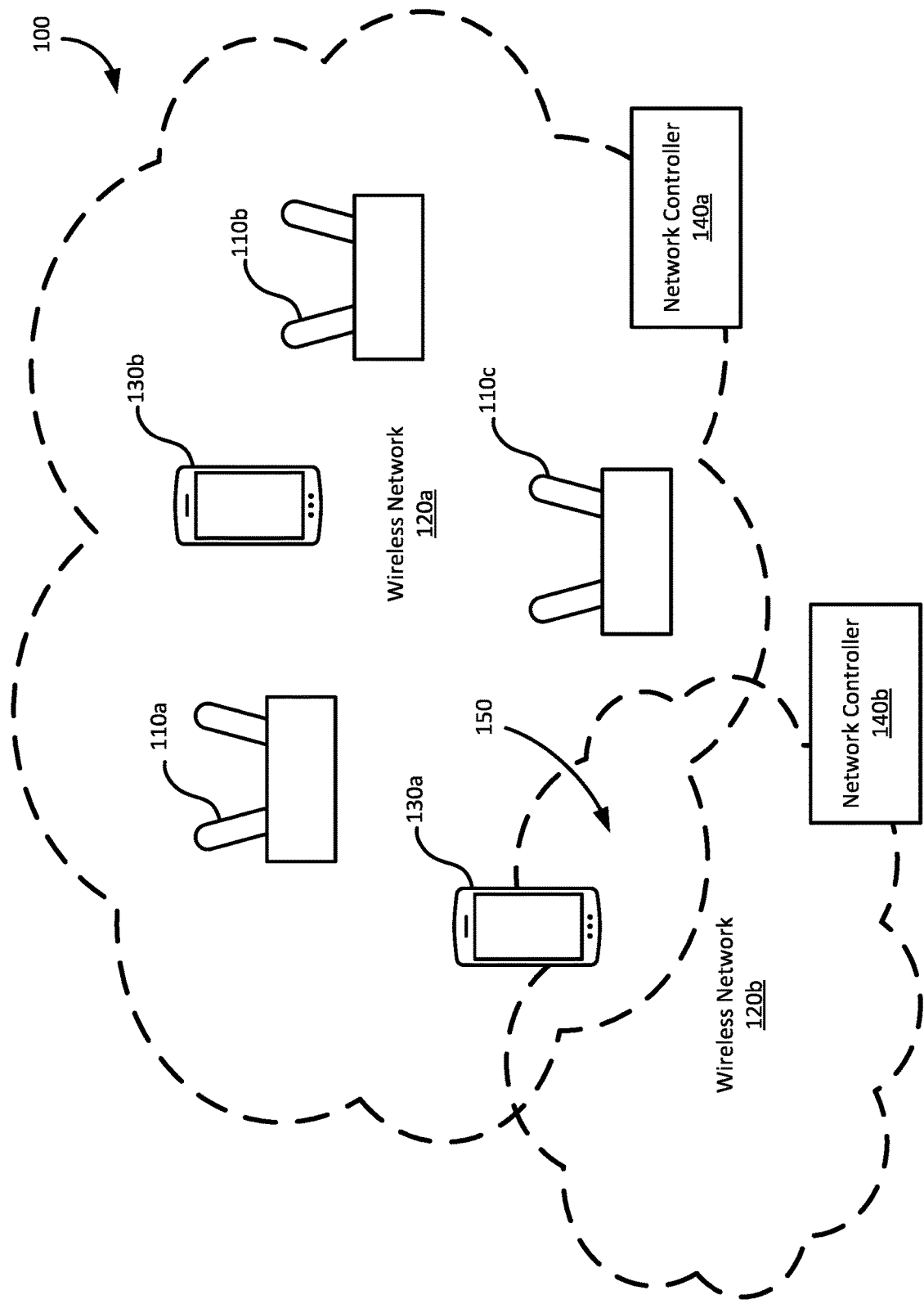
FIG. 1 illustrates a network environment, according to embodiments of the present disclosure.

FIG. 1 illustrates a network environment 100, according to embodiments of the present disclosure. In FIG. 1, one or more Access Points (APs) 110a-d (generally or collectively, AP 110) provide a first wireless network 120a (generally or collectively, wireless network 120) to various User Equipment (UE) 130a-b (generally or collectively UE 130) in the environment 100. As shown, a second wireless network 120b partially overlaps the coverage area of the first wireless network 120a, and a UE 130 in the overlapped area 150 may be served by either wireless network 120 (or receive signals intended for use in the other wireless network 120). In various embodiments, a wireless network 120 is a cellular or Wi-Fi based network offered to users in a public or private venue. In various embodiments, each wireless network 120 includes an associated network controller 140a-b (generally or collectively, network controller 140) that communicates with the APs 110 within the given wireless network 120 to coordinate network management among the APs 110, although the APs 110 can also manage the network among themselves, thus omitting the network controller 140 in some embodiments.

The APs 110 can offer wireless communication sessions in the wireless network 120 according to various Radio Access Technologies (RAT) and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR) networks, Citizens Broadband Radio Service (CBRS) networks, or the like. Example hardware as may be included in an AP 110 is discussed in greater detail in regard to FIG. 8.

The UE 130 may include any computing device that is configured to wirelessly connect to one or more APs 110. Example UE 130 can include, but are not limited to: smart phones, feature phones, tablet computers, laptop computers, desktop computers, Internet of Things (IoT) devices, and the like. In various embodiments, the UE 130 can also be referred to as a station (STA), a client device (CD), a user device, or an endpoint. Example hardware as may be included in a UE 130 is discussed in greater detail in regard to FIG. 8.

The network controller 140, if included, may include any computing device or cloud based service that is configured to interface with two or more APs 110 to coordinate how spectrum and services are shared in the environment 100. The network controller 140 can be provided on a separate computing device connected to the individual APs 110 via wired or wireless communications, may be included with a "central" or "commander" AP 110, or may be provided in an ad hoc arrangement via a collective of two or more APs 110 negotiating among themselves for network management. Accordingly, any action ascribed to the network controller 140 in an example given in the present disclosure may also or instead be ascribed to one or more of the APs 110. Example hardware as may be included in a network controller 140 is discussed in greater detail in regard to FIG. 8.

In some embodiments, the network controllers 140 of two or more different wireless networks 120 may be in communication with one another to coordinate how the available bandwidth is shared in the overlapping area 150, to coordinate handoff of service of UE 130 from one wireless network 120 to the other, or the like. In various embodiments, the two or more wireless networks 120 may share a single network controller 140 to manage the multiple wireless networks 120 as separate, but coordinated Overlapping Basic Service Sets (OBSS).

Each AP 110 may include one or multiple radios that are used in different roles in providing the associated wireless network 120. For example, a first radio may be tuned for a first frequency and a second radio is tuned for a second frequency. In another example, two radios tuned to the same frequency may offer different dispersion patterns or beam shapes, such as a first radio that uses an antenna that provides an omnidirectional signal and a second radio that uses an antenna that provides a directional or beam-formed signal.

Some of the antennas used by the APs 110 may be omnidirectional, and disperse transmission power evenly in every direction, although the precise coverage in the environment 100 of an omnidirectional signal from a given AP 110 can be based on the transmission power of the AP 110 and any intervening objects that may disrupt signal transmission.

In additional to omnidirectional ranges, some APs 110 can include antennas or antenna arrays capable of directional transmission. Directional transmission allows, for an equivalent power to an omnidirectional transmission, more power to be focused in a given direction. For example, an AP 110 can use a directional antenna to produce a directional coverage range, also referred to as a beam-formed range, that focuses the transmission energy to a certain area in the environment 100. In various embodiments, a beam-formed range may extend past the omnidirectional range of the associated AP 110 using the same or less transmission power than the equivalent omnidirectional signal. In various embodiments, the beam-formed ranges are provided by beam steerable antenna arrays, which allow the direction in the environment 100 that the directional antenna projects the directional signal to change; steering where the beam-formed range projects from the AP 110.

In various embodiments, some of the APs 110 include radios that can switch between using different antennas, such as an omnidirectional antenna and a steerable directional antenna, to send and receive signal thereby. For example, the switchable radio may use a first antenna in some situations and the second antenna in other situations to switch between using omnidirectional signaling patterns and directional signaling patterns in different use cases.

As part of managing the wireless network 120, the network controller 140 identifies the arrangement of antennas, including beamwidth, steering angles, channels/frequencies to transmit and receive on, and transmission powers to use to provide network coverage in the environment 100.

Figure 2A:
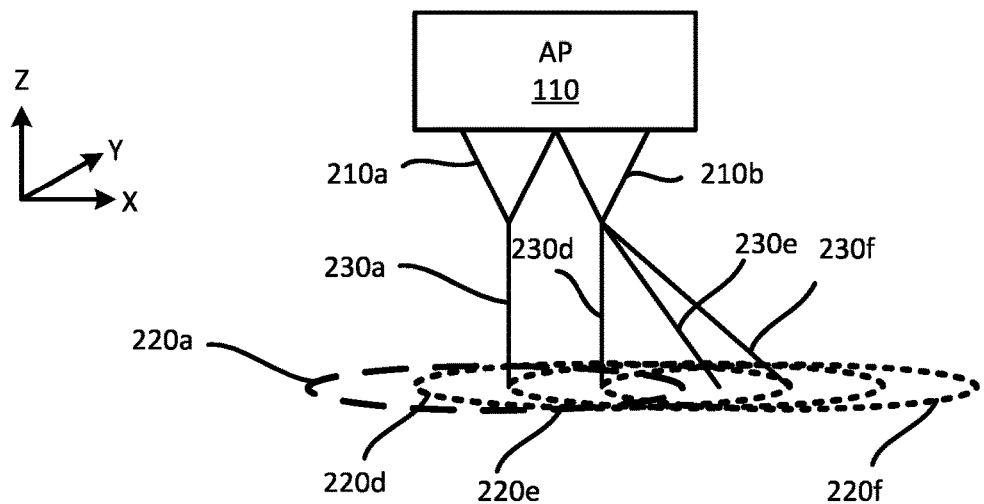
FIGS. 2A-2F illustrate coverage ranges for an antenna array using the steerable beam arrays included therein, according to embodiments of the present disclosure.
Figure 2B:
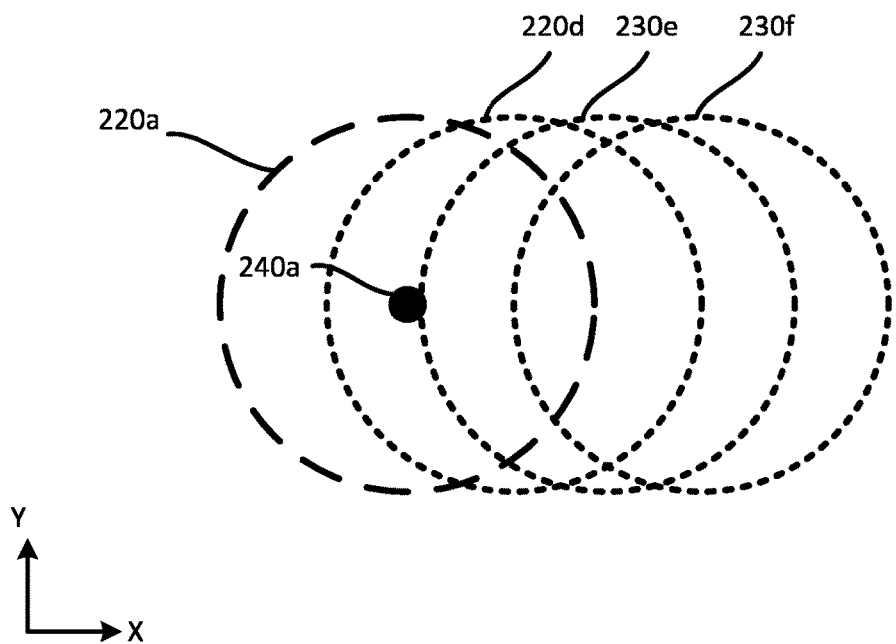
Figure 2C:
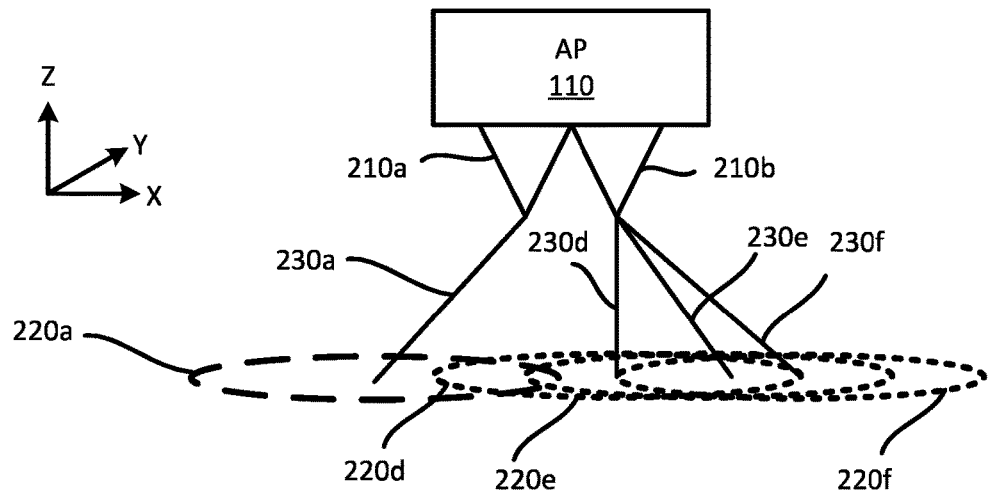
Figure 2D:
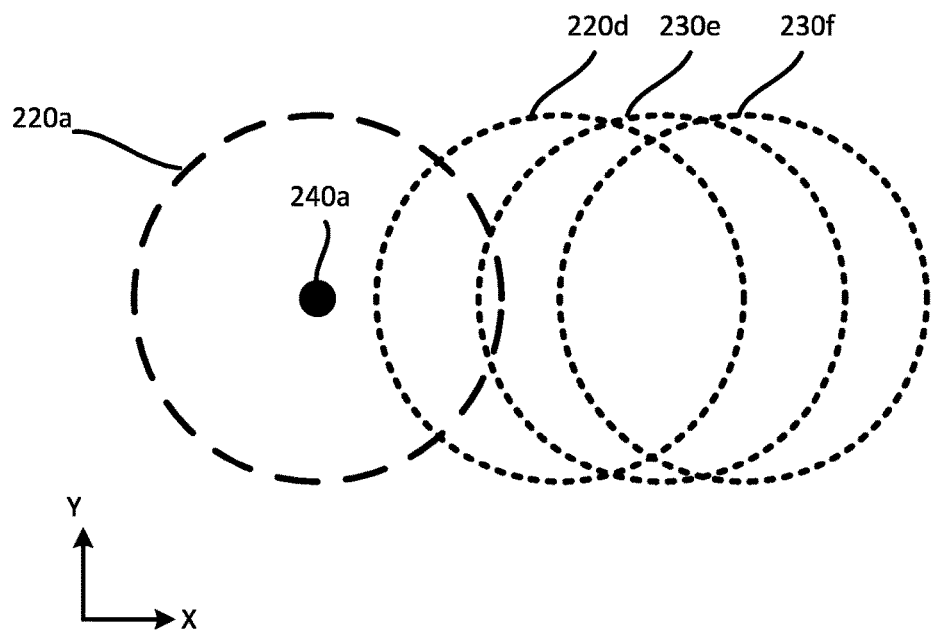
Figure 2E:
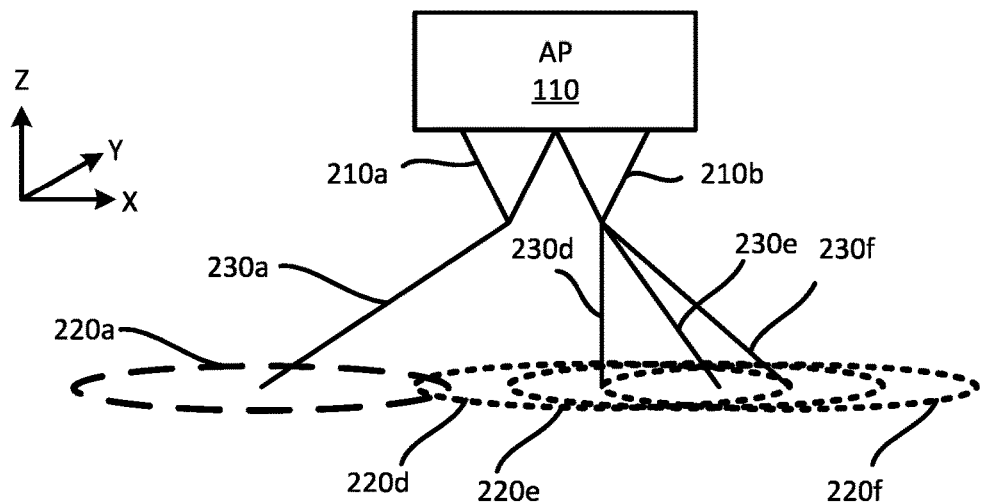
Figure 2F:
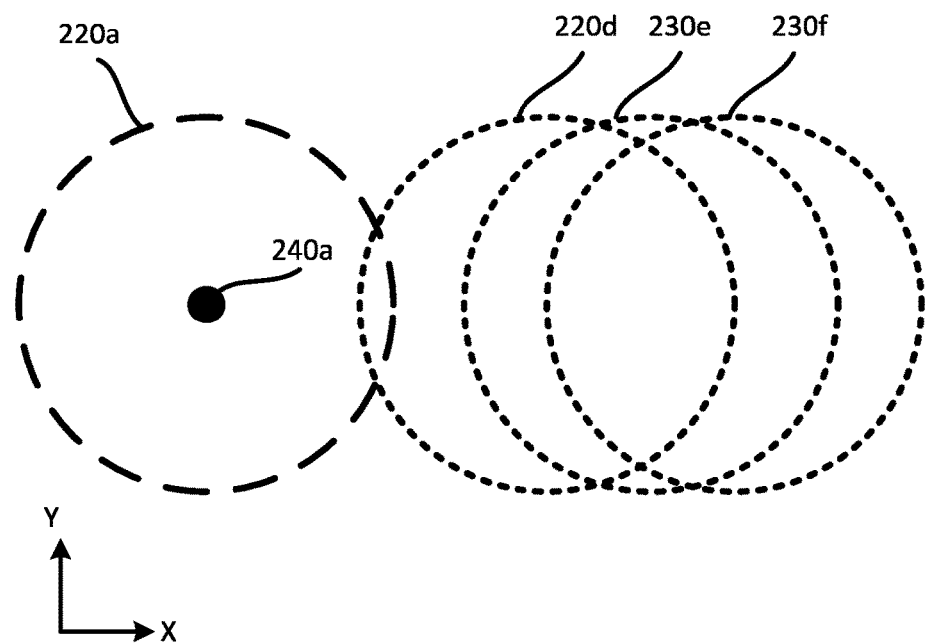

FIGS. 2A-2F illustrate coverage ranges 220a-f for an AP 110 including a radio with a steerable antenna array using steerable beam arrays 210a, 210b included therein, according to embodiments of the present disclosure. FIGS. 2A, 2C, and 2E provide isometric views of the coverage ranges 220a-f in relation to the AP 110 and the steerable beam arrays 210a, 210b, while FIGS. 2B, 2D, and 2F provide overhead views of the coverage ranges 220a-f (e.g., in the YX plane). When using the steerable beam arrays 210a, 210b, an AP 110 can send and receive signals with various devices located within the respective coverage ranges 220a-f for those steerable beam arrays 210a, 210b. The steerable beam arrays 210a, 210b generate respective steerable beams 230a-f (i.e., beams that are steerable to different angles of transmission relative to the steerable beam arrays 210a, 210b) to generate the corresponding coverage ranges 220a-f, 220b centered at a given point 240a-c in the environment. As illustrated, the steerable beams 230a-f are shown at the center of the corresponding coverage ranges 220a-f, emanating from the respective steerable beam arrays 210a, 210b.

Each of FIGS. 2A-2F illustrate three potential steering arrangements for the second steerable beam array 210b in relation to one potential steering arrangement for the first steerable beam array 210a in a given figure. Each of the steerable beam arrays 210a, 210b are independently and separately steerable from one another, and thus in embodiments with X potential steering arrangements, there are $X^2$ potential overall arrangements. For example, a first and second steerable beam array 210a, 210b each with three potential steering states provide a total of nine different potential steering arrangements.

FIGS. 2A and 2B illustrate the first steerable beam array 210a producing a steerable beam 230a having a first steerable coverage range 220a in a first position and the fourth, fifth, and sixth steerable beams 230d-f that the second steerable beam array 210b can produce with the respective fourth, fifth, and sixth steerable coverage ranges 220d-f. The first steerable coverage range 220a and the fourth steerable coverage range 220d form a boresight coverage pattern, with significant overlap between the coverage ranges of the different steerable beam arrays 210a, 210b (e.g., a greatest amount of overlap of the potential patterns). As the second steerable beam array 210b steers the steerable beams from the fourth position 230d to the fifth position 230e and from the fifth position 230e to the sixth position 230f (i.e., further away from the first steerable coverage range 220a than the fourth coverage range 220d), the overlap between the coverage ranges decreases. Although the first coverage range 220a is illustrated as having at least some overlap with the fifth and sixth coverage range 220e-f in FIGS. 2A and 2B, in various embodiments, spatial isolation can exist between the first coverage range 220a and one or more of the fifth and sixth coverage ranges 220e-f, where no overlap exists between the respective coverage ranges.

FIGS. 2C and 2D illustrate the first steerable beam array 210a producing a steerable beam 230b having a second steerable coverage range 220b in a second position and the fourth, fifth, and sixth steerable beams 230d-f that the second steerable beam array 210b can produce with the respective fourth, fifth, and sixth steerable coverage ranges 220d-f. The second steerable coverage range 220b provides less overlap and/or more spatial isolation to the fourth, fifth, and sixth coverage ranges 220d-f than the first steerable coverage range 220a does respectively.

FIGS. 2E and 2F illustrate the first steerable beam array 210a producing a steerable beam 230c having a third steerable coverage range 220c in a third position and the fourth, fifth, and sixth steerable beams 230d-f that the second steerable beam array 210b can produce with the respective fourth, fifth, and sixth steerable coverage ranges 220d-f. The third steerable coverage range 220c and the sixth steerable coverage range 220f form an expanded linear coverage pattern, with significant spatial isolation between the coverage ranges of the different steerable beam arrays 210a, 210b (e.g., a greatest amount of spatial isolation of the potential patterns). The third steerable coverage range 220c provides less overlap and/or more spatial isolation to the fourth, fifth, and sixth coverage ranges 220d-f than the second steerable coverage range 220b does respectively.

Figure 3:
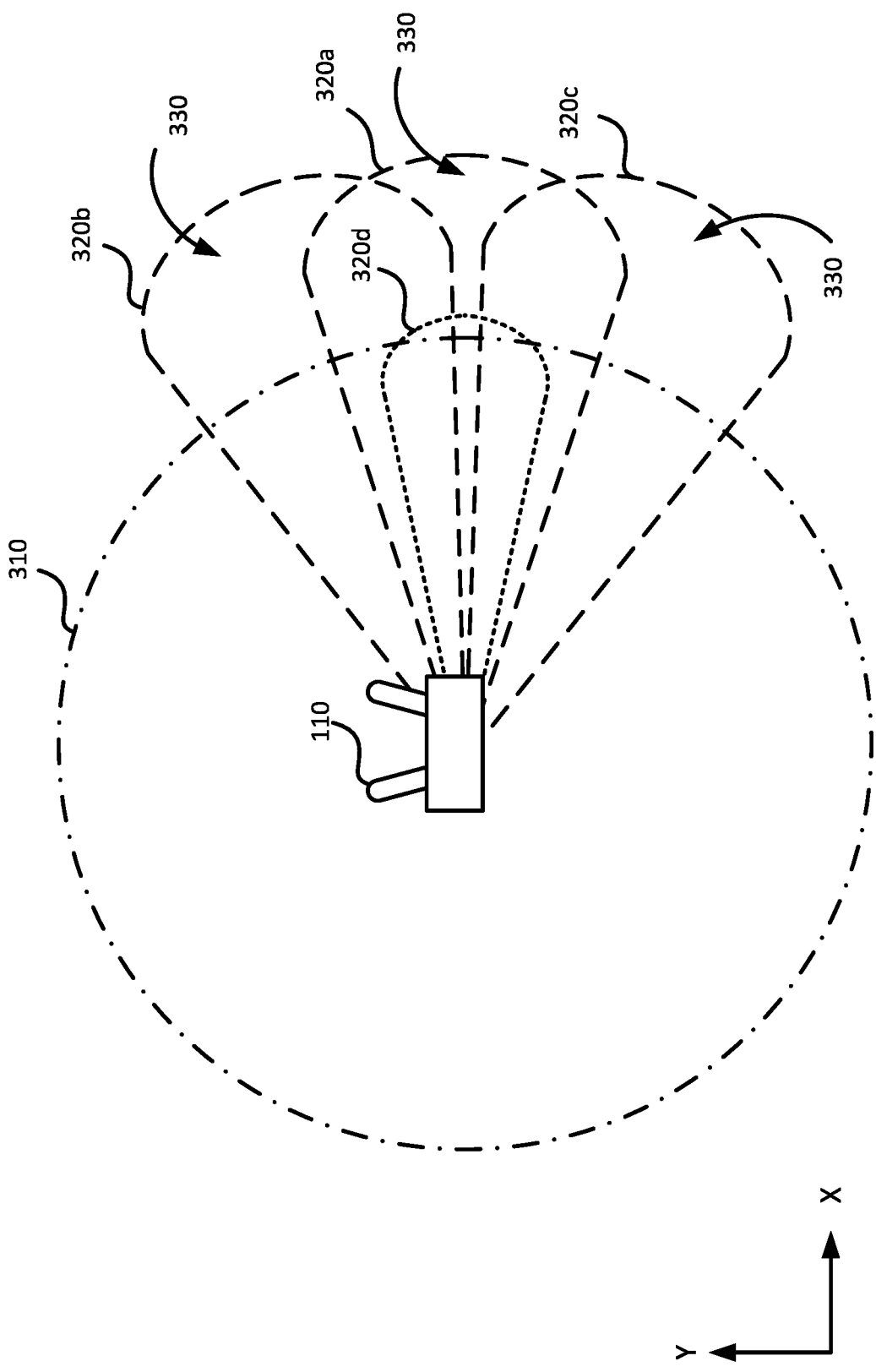
FIG. 3 illustrates a comparison between an omnidirectional range and several beam-formed ranges of an AP, according to embodiments of the present disclosure.

FIG. 3 illustrates a comparison between an omnidirectional range 310 and several beam-formed ranges 320a-d (generally or collectively, beam-formed range 320) of an AP 110, according to embodiments of the present disclosure. In various embodiments, an AP 110 capable of beam-forming can include various antennas that can be set up to produce different beam-formed ranges 320. Additionally or alternatively, an AP 110 can include more than one directional antenna (which may be static or steerable) that are configured to produce several different beam-formed ranges 320. In various embodiments, the steerable directional antennas of the AP 110 are physically steered (e.g., by mechanically rotating a directional antenna to point in a given direction) or electrically steered (e.g., via a phased array on antennas applying different phase offset to a signal to produce a desired constructive and destructive interference pattern at the signal generation source).

Each of the illustrated beam-formed ranges 320a-d shown in FIG. 3 are the result of different beamforming arrangements, which can include using different directional antennas, different mechanical settings for rotating a directional antenna, different phase offsets to electrically steer a beam generated by a directional antenna, different transmission power levels, different carrier frequencies, and combinations thereof. Although illustrated in FIG. 3 with four beam-formed ranges 320a-d, in various embodiments, an AP 110 can have more than or fewer than four beamforming arrangements, and thus more or fewer than four beam-formed ranges 320a-d.

For example, the AP 110 can steer the directional antenna in the XY plane (rotating about the Z axis) to the first through third beamforming arrangements to produce the corresponding first through third beam-formed ranges 320a-c. Similarly, the AP 110 can steer the directional antenna from the first beamforming arrangement in the YZ plane (rotating about the X axis) to steer the primary lobe "downward" to produce the fourth beamforming arrangement and the fourth beam-formed range 320d. Additionally or alternatively, the AP 110 can reduce the transmission power of the directional antenna, so that the first beam-formed range 320a and the fourth beam-formed range 320d are both produced with the same directional antenna steered to the same angle, but with lower transmission power for the fourth beam-formed range 320d relative to the first beam-formed range 320a.

Depending on the particular beamforming arrangements available for the AP 110 to select between and the positions of the APs 110 in the environment 100, various signaling ranges may partially or fully overlap one another. These overlaps may include single-AP overlaps (as shown in FIG. 3) or multi-AP overlaps (as shown in FIGS. 4A-4D). Accordingly, if the first beam-formed range 320a is used to transmit data from the AP 110 to a UE 130 within that range, the AP 110 could potentially use the second through fourth beam-formed ranges 320b-d instead to communicate with that UE 130. However, other APs 110 may also attempt to communicate with an UE 130.

Various environmental factors can affect the overlapping ranges of the various beam-formed ranges 320 and the omnidirectional range 310. Therefore, the AP 110 performs various sounding operations to determine the transmission power and steering arrangement in the specific environment where the AP 110 is deployed to account for multi-pathing and various environmental interference sources. However, sounding for one beamforming arrangement does not provide AP 110 with statistical or definitive knowledge about different beamforming arrangements. Accordingly, an UE 130 can be assigned to the same channel by the associated AP 110 and receive cross-talk from other UEs 130 or APs 110 than the associated AP 110.

FIGS. 4A-4E illustrate several coverage arrangements 400a-e (generally or collectively coverage arrangement 400) to provide a wireless network 120 to a designated area 430, according to embodiments of the present disclosure. In each of the coverage arrangements 400a-d, various APs 110a-c supply corresponding coverage patterns that define where the wireless network 120 is provided in the environment 100 relative to the designated area 430. As is described in greater detail in relation to FIGS. 2A-2F and 3, each of the APs 110 may offer one or several different coverage patterns, which may include different beamwidths, different steering angles, and combinations thereof. Accordingly, more or fewer APs 110 offering more or different coverage patterns than those discussed in the examples are contemplated by the present disclosure.

For purpose of the examples given in FIGS. 4A-4E, each AP 110a-c offers a corresponding first coverage pattern 410a-c (generally or collectively, first coverage pattern 410) for a first beamwidth via a fixed or static steering arrangement and a second coverage pattern 420a-c (generally or collectively, second coverage pattern 420) for a second beamwidth via a steerable antenna array. Each AP 110 may switch between using one of the first coverage pattern 410 or the second coverage pattern 420, steer the second coverage pattern 420 (if using the second coverage pattern 420), and select a transmission power therefor independently of the other APs 110. A network controller 140 (not illustrated) may coordinate the coverage arrangement selected for the APs 110.

Figure 4A:
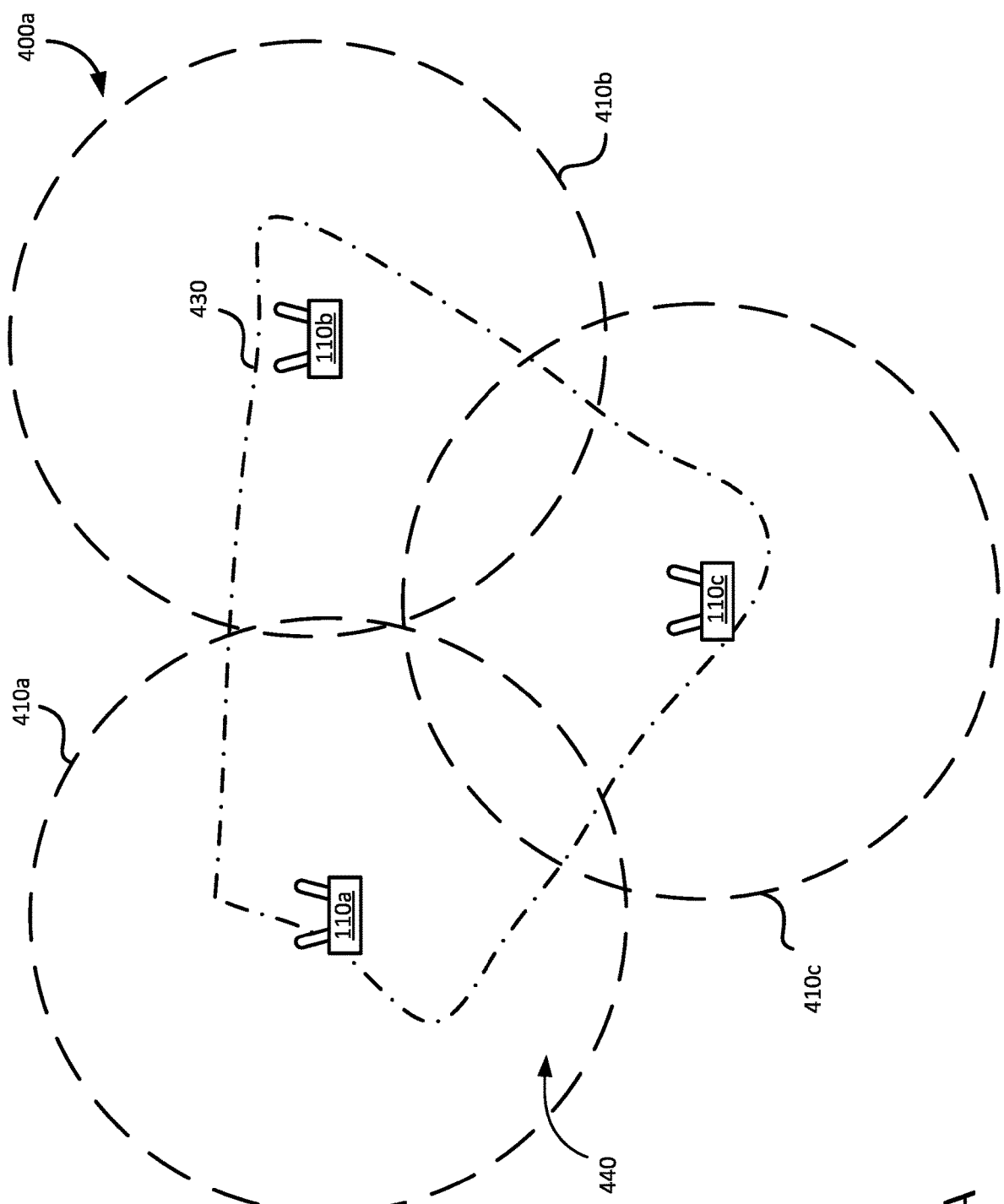
FIGS. 4A-4E illustrate several coverage arrangements to provide a wireless network to a designated area, according to embodiments of the present disclosure.

FIG. 4A illustrates a first coverage arrangement 400a, in which each of the APs 110a-c uses the first coverage pattern 410a-c. Although the APs 110 generally provide the wireless network 120 to the designated area 430, the first coverage arrangement 400a results in network coverage that extends outside of the designated area 430, which may interfere with other wireless networks 120 or extend the network operator's coverage beyond a desired space into external areas 440. These external areas 440, where the coverage patterns overlap with areas outside of the designated area 430, further require additional power to produce, with often little benefit to the network operator, and potential detriment to nearby or neighboring networks that could benefit from free access to the spectrum in those external areas 440 (which may be part of a designated area 430 for the neighboring network).

Figure 4B:
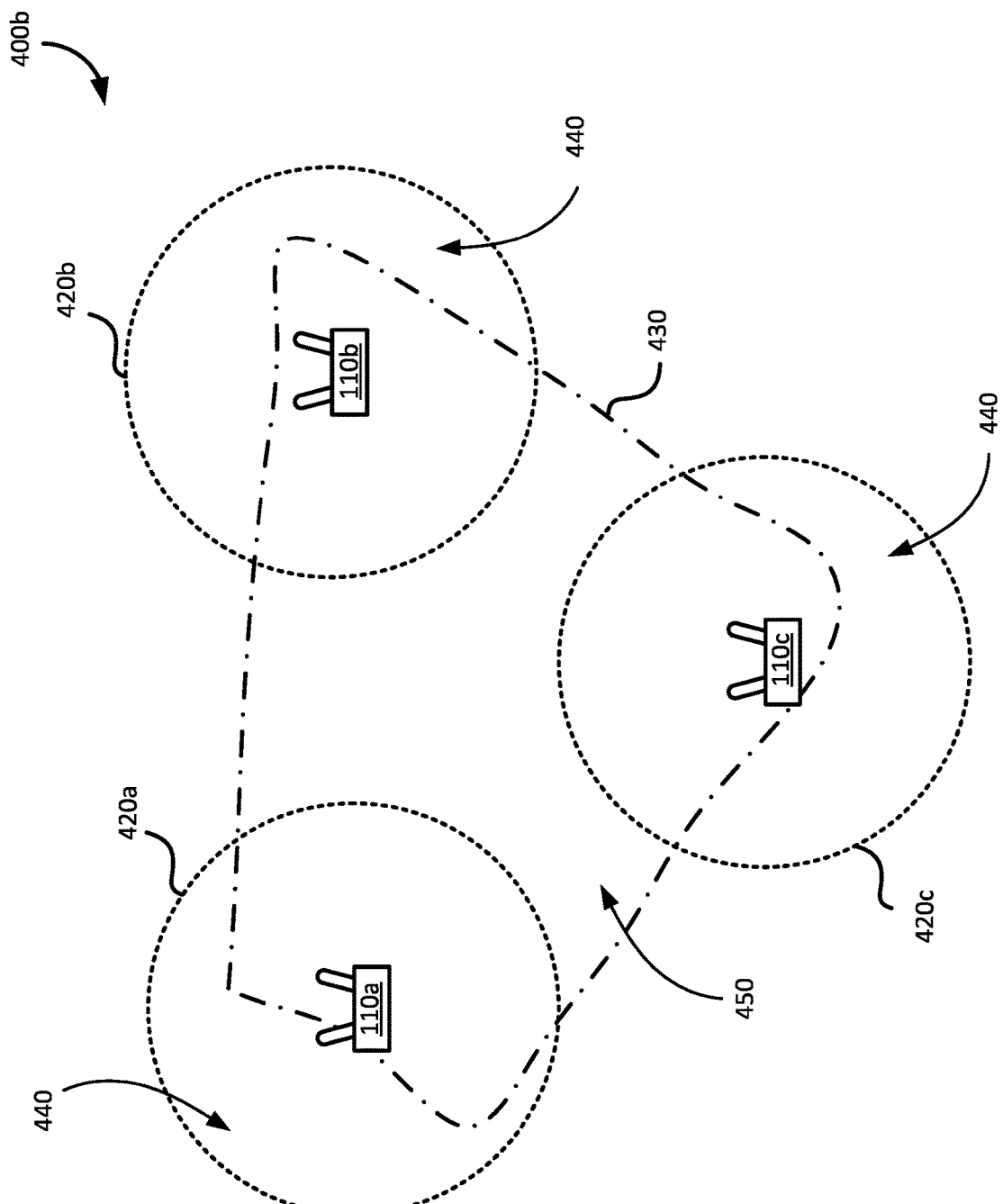

FIG. 4B illustrates a second coverage arrangement 400b, in which each of the APs 110a-c uses the second coverage pattern 420a-c steered in a boresight pattern centered on the corresponding AP 110. Although the second coverage arrangement 400b decreases the total area covered by the external areas 440, the second coverage arrangement 400b results in unserved area 450 within the designated area 430 (e.g., where the coverage patterns to not overlap the designated area 430). Although some unserved area 450 may be acceptable in a deployment (e.g., in areas where wireless connectivity, while nominally provided may be infrequently used), when the coverage patterns do not overlap one another, the APs 110 may be unable to handoff a UE 130 between one another, or provide network coverage to the users located in the unserved area 450; generally not providing network coverage as desired by the network operator.

Rather than deploying a series of APs 110 with various coverage patterns to different points of the environment 100 to reduce areas included in the external areas 440 in FIG. 4A and decrease the unserved area 450 in FIG. 4B, a network operator can apply the present disclosure to select a coverage arrangement 400 on the fly based on current signaling needs so that APs 110 can remain in one location and react to the signaling needs of the wireless network 120 (and neighboring networks). By selecting a new coverage arrangement 400 using an existing installed base of APs 110, a network operator can react to developments in the local environment (e.g., new networks coming online or extending into the space near or served by the wireless network 120, networks going offline or reducing associated footprints, etc.).

Figure 4C:
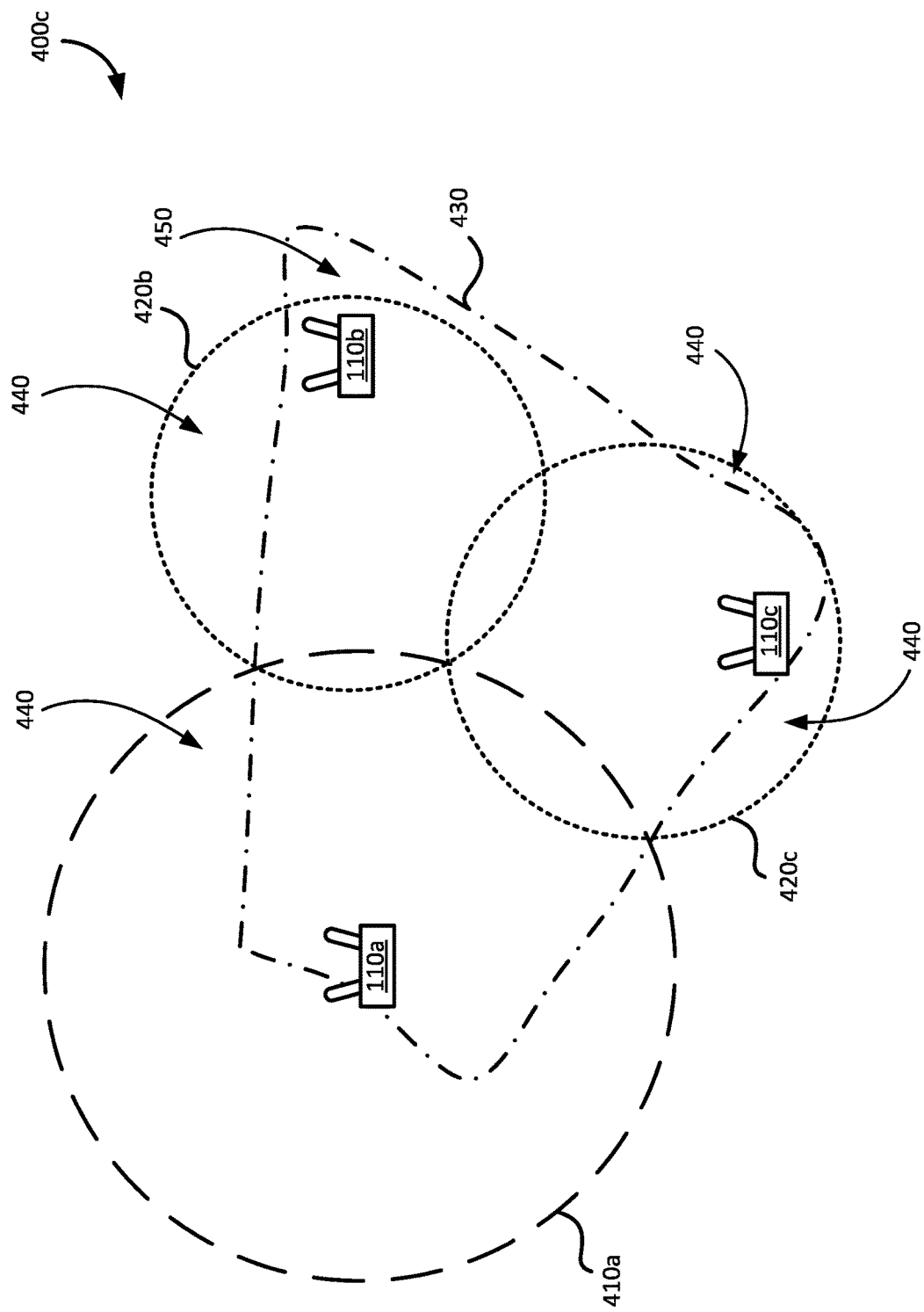

FIG. 4C illustrates a third coverage arrangement 400c, in which the first AP 110a uses a first coverage pattern 410a, while the second and third APs 110b-c each use corresponding second coverage patterns 420b-c, steered away from the boresight pattern and inward to the designated area 430. Accordingly, the network operator can reduce the extents of the external areas 440 and unserved areas 450 (compared to FIGS. 4A and 4B) while also using less or more focused power for transmissions. In various embodiments, the network operator may leave the external area 440 relatively large in portions of the environment 100 where no overlap is expected with a neighboring network or where the network operator has superior rights (e.g., does not have to defer or coordinate with the other network).

Figure 4D:
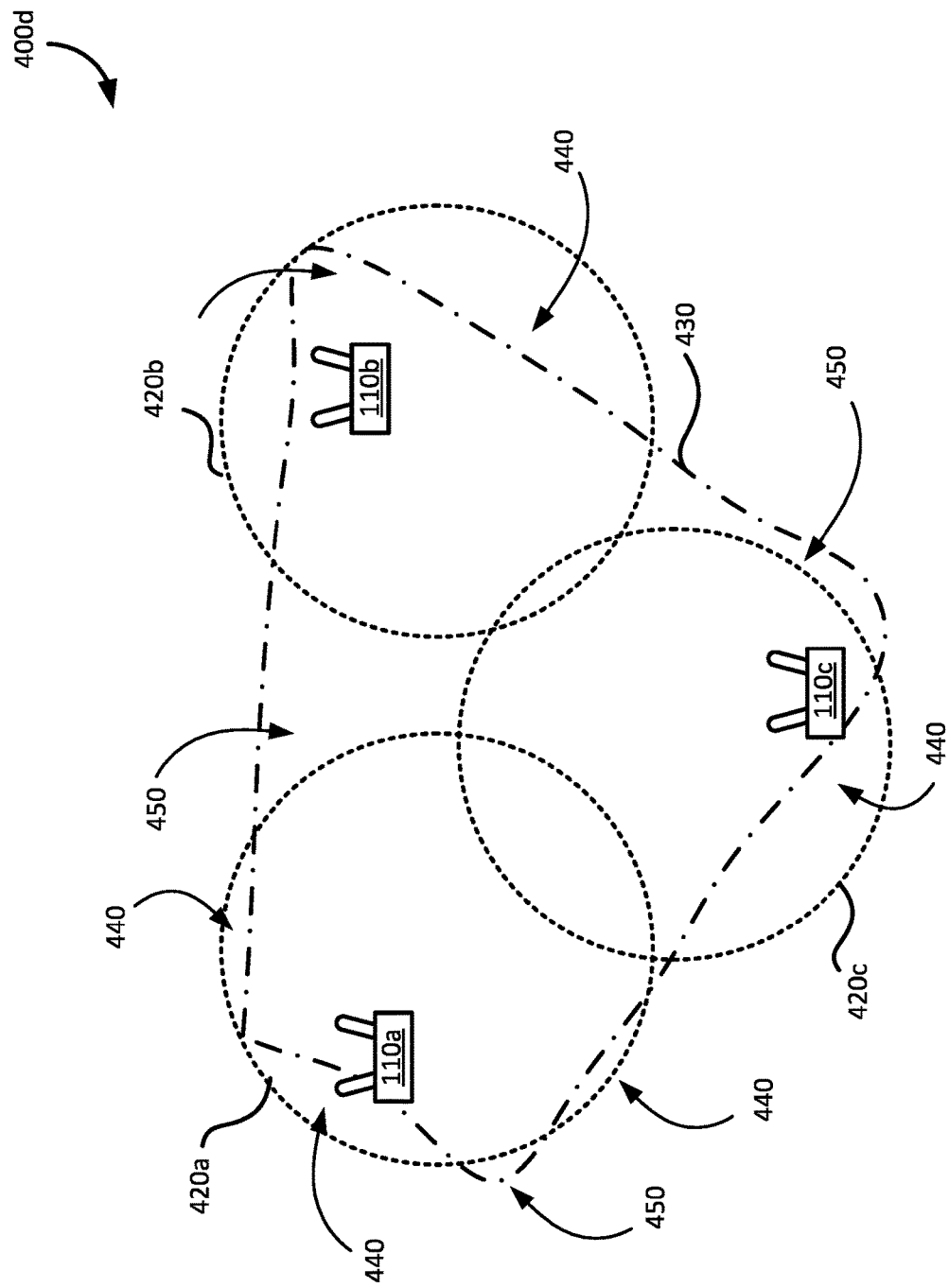
Figure 4E:
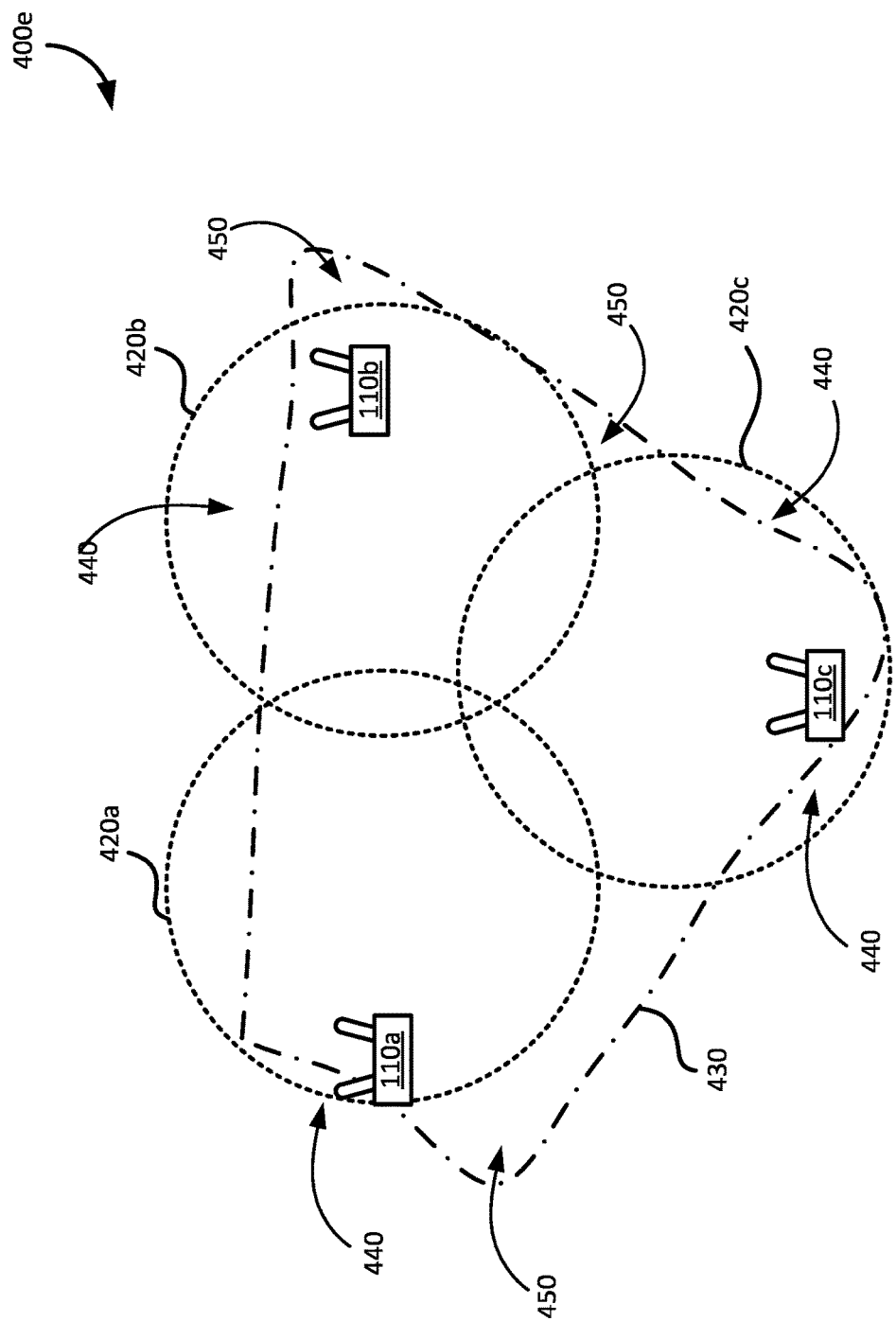

FIG. 4D illustrates a fourth coverage arrangement 400d and FIG. 4E illustrates a fifth coverage arrangement 400e in which each of the APs 110a-c uses the second coverage pattern 420a-c steered away from the boresight pattern and inward to the designated area 430, albeit at different steering angles from one another. Each of the fourth coverage arrangement 400d and the fifth coverage arrangement 440e result in a lower extent of external areas 440 than the third coverage arrangement 400c, and different areas of the designated area 430 marked as unserved areas 450 from one another. Accordingly, a network controller 140 can switch the APs 110 between the fourth coverage arrangement 400d and the fifth coverage arrangement 400e to cover all of the designated area 430 while reducing external areas 440 affected by the signals generated by the APs 110. For example, an AP 110 may project a signal in a first steering arrangement and steer the signal to a second steering arrangement to move the coverage range as various UE 130 move towards unserved areas 450, thus providing the wireless network 120 in previously unserved areas 450 without moving or redeploying the APs 110.

In various embodiments, the network controller 140 can further reduce the effect of the transmissions from the APs 110 (and thereby reduce the extent to the external areas 440) by reducing the transmission power of the APs 110 below an ideal transmit power control (TPC) computed power level for the APs 110, and instead steer the coverage areas of the APs 110 to desired locations to serve UEs 130 within the coverage areas.

Figure 5A:
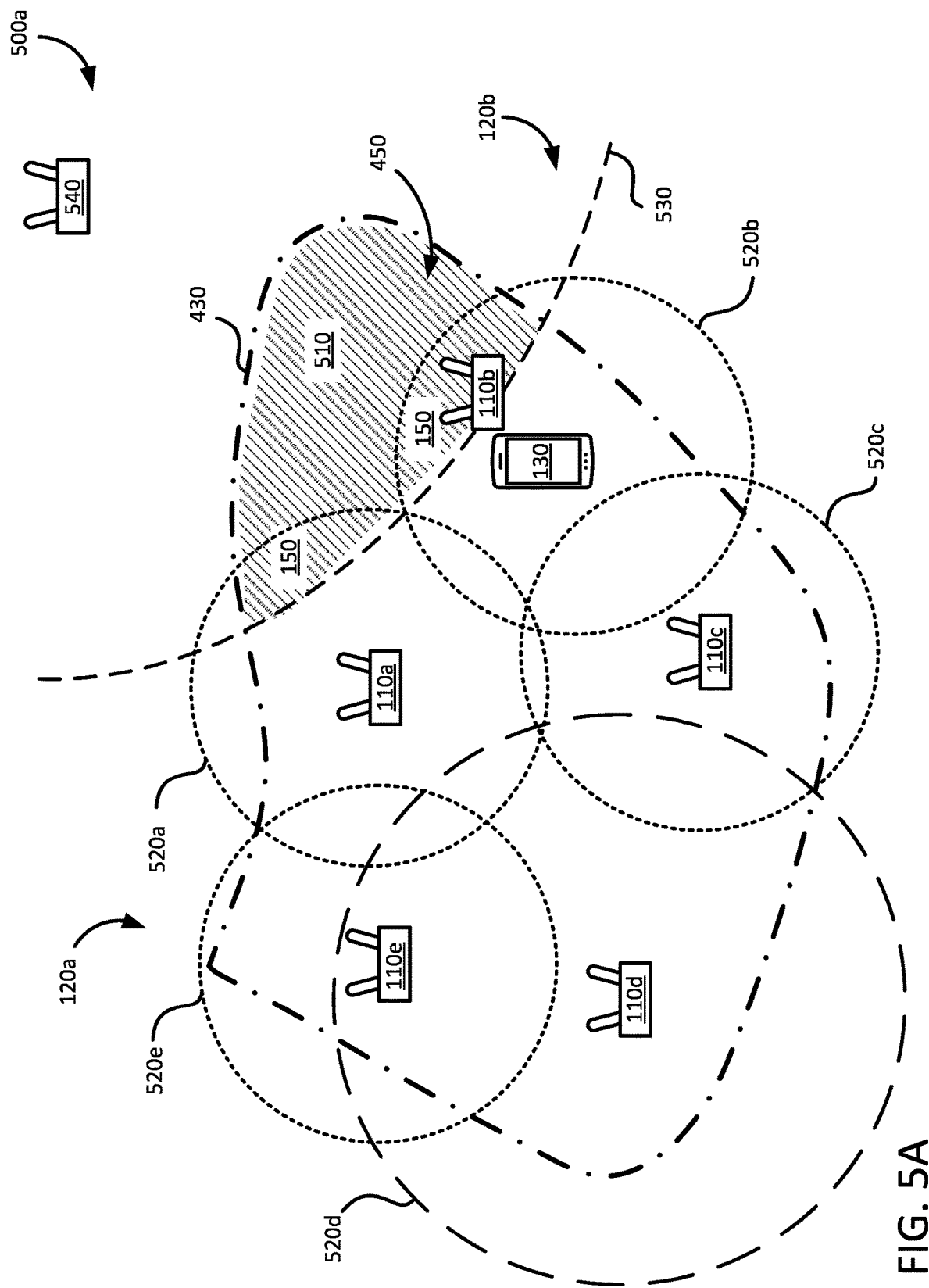
FIGS. 5A and 5B illustrate deferential avoidance of and incursion into an avoidance area associated with a neighboring network, according to embodiments of the present disclosure.
Figure 5B:
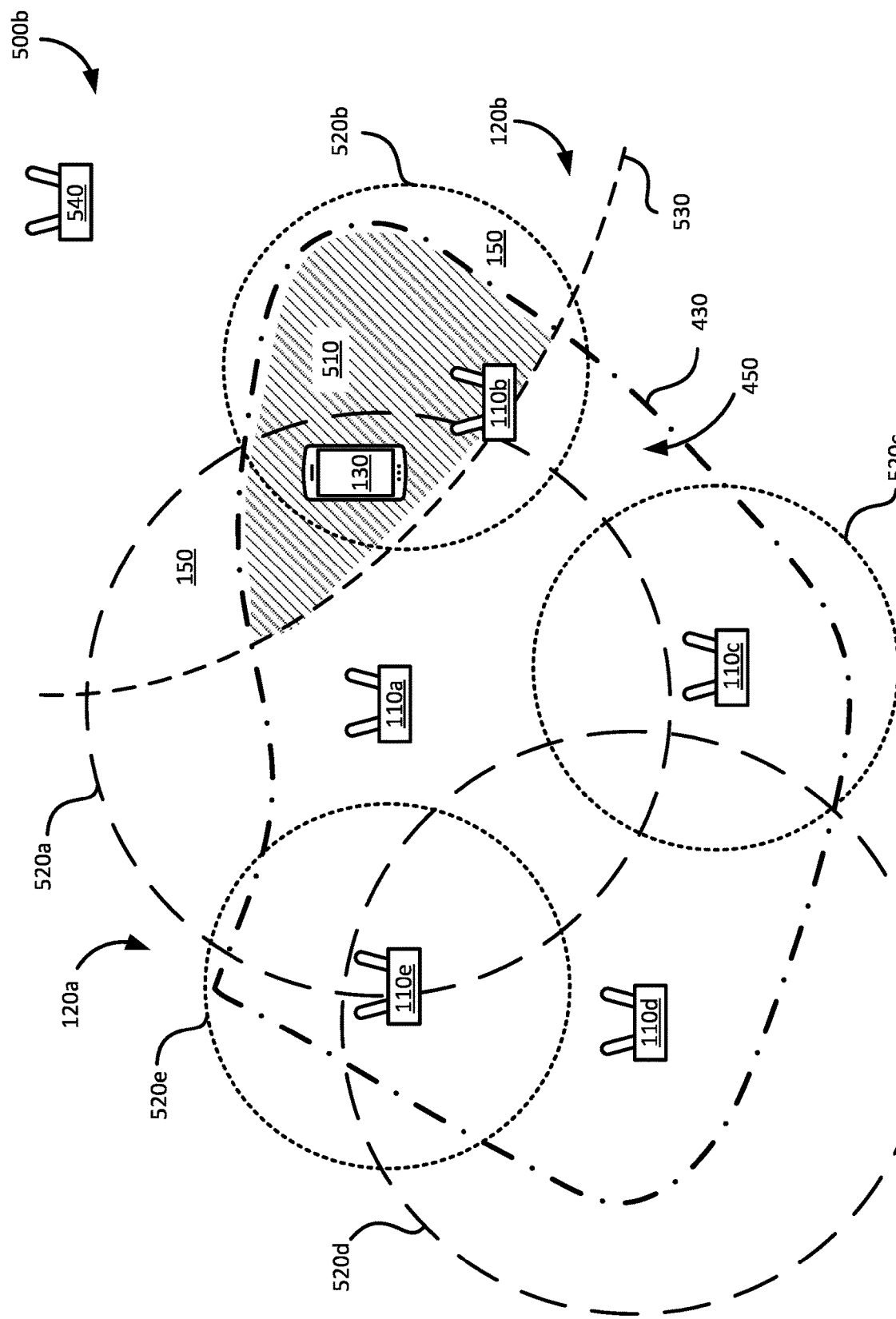

FIGS. 5A and 5B illustrate deferential avoidance of and incursion into an avoidance zone 510 associated with a neighboring network, according to embodiments of the present disclosure. As shown in each of FIG. 5A and FIG. 5B, several APs 110a-e that offer a first wireless network 120a provide associated coverage areas 520a-e (generally or collectively, coverage area 520) that cover at least some of a designated area 430 at any given time. As described, one or more of the APs 110 may offer different sizes and positions of the respective coverage areas 520 via beamwidth selection and beamsteering, as may be chosen by a network controller 140.

In the illustrated examples, a portion of the designated area 430 is also covered by a signaling range 530 of an external signaling source 540 that offers a second wireless network 120b. In various embodiments, the external signaling source 540 includes one or more APs 110 belonging to a separate second wireless network 120b from the first wireless network 120a provided by the APs 110a-e. In various embodiments, the associated network controllers 140 for the wireless networks 120 coordinate the selected coverage areas 520 and signaling ranges 530 and network resource assignment therein. Additionally or alternatively, a network controller 140 can react to the signaling range 530 (and the network resources used) to set the coverage areas 520 to avoid conflict between the wireless networks 120, either to avoid inducing interference on the second wireless network 120*b* or to avoid interference from the second wireless network 120*b* on the first wireless network 120*a*.

The use and control of the various APs 110*a*-*e* in the first wireless network 120*a* to selectively avoid (at least some of the time) a portion of the designated area 430 that is overlapped by the signaling range 530 of a second wireless network 120*b* therefore results in an avoidance zone 510. The avoidance zone 510 is a portion of the designated area 430 where the network operator has designated that coverage of the first wireless network 120*a* shall extend to, but where coverage may not always be needed. For example, a remote corner of an office may be infrequently visited by users of wireless signaling devices (e.g., according to use pattern heat maps or histograms), an outdoor seating area of a restaurant may not be used during inclement weather, or a shared area is provided network access to allow for handoff of service, but is otherwise left unserved by at least one of the wireless networks 120. In each of these examples, an operator of the first wireless network 120*a* may be obligated to or desire to provide network access in the avoidance zone 510 at least some of the time, but at other times may yield network coverage in the avoidance zone 510 to a second wireless network 120*b* to avoid conflict between the two wireless networks 120.

FIG. 5A illustrates a deferential avoidance scheme 500*a* that reduces coverage overlap in an avoidance zone 510 between a first wireless network 120*a* and a second wireless network 120*b*, while FIG. 5B illustrates an intruding avoidance scheme 500*b* to provide an incursion of network provision, by the first wireless network 120*a*, into the avoidance zone 510. In various embodiments, either the deferential avoidance scheme 500*a* or the intruding avoidance scheme 500*b* may represent a base scheme for providing the first wireless network 120*a* where the other scheme represents a temporary state to yield or claim coverage area as network usage dictates.

As illustrated, the first coverage area 520*a* and the second coverage area 520*b* are adjustable to provide different coverage to different areas in the environment. As shown, the first AP 110*a* changes the area served by adjusting a beamwidth of transmission; providing a first (smaller or tighter) beamwidth in FIG. 5A and a second (larger or wider) beamwidth in FIG. 5B to cover a greater area in FIG. 5B than in FIG. 5A. In each of FIGS. 5A and 5B, the first coverage area 520*a* is centered on the first AP 110*a*, whether due to beamsteering or the associated antennas being fixed in steering angle to a pattern centered on the first AP 110*a*. In contrast, the second AP 110*b* changes the area served by steering the second coverage area 520*b* to different positions in the environment, while maintaining the same beamwidth for transmission in FIG. 5A and in FIG. 5B. In various embodiments, depending on the capabilities of the associated APs 110 and desired overall coverage pattern, a network controller 140 may adjust one or both of a beamwidth and a steering angle for a given AP 110 to change where the associated coverage area 520 projects.

As shown in FIG. 5A, the first AP 110*a* and the second AP 110*b* project a first coverage area 520*a* and a second coverage area 520*b* to reduce an extent of overlapped area 150 from the first wireless network 120*a* into the second wireless network 120*b* in the avoidance zone 510, which may result in some of the avoidance zone 510 being an unserved area 450 within the designated area 430. However, when the first wireless network 120*a* determines to extend coverage into the avoidance zone 510, as in FIG. 5B to serve a UE 130 located in the avoidance zone 510, the extent of the overlapping area 150 increases, and the extent of the unserved area 450 decreases as service extends into the avoidance zone 510. In various embodiments, when extending into the avoidance zone 510 to remove or mitigate the extent of an unserved area 450 the network controller 140 may attempt to reduce the mitigate how much the overlapping areas 150 increases to extend into external areas 440 (e.g., when portions of the new coverage area are not used to provide coverage in the designated area 430).

In some embodiments, adjusting the coverage area 520 to provide service in the avoidance zone 510 may result in the creation or expansion of unserved areas 450 elsewhere in the designated area 430. Accordingly, although not illustrated, the network controller 140 may adjust the beamwidth, steering angle, or combined beamwidth and steering angle of one or more of the other APs 110*c*-*e* to eliminate, mitigate, or otherwise reduce the size of the unserved area 450 caused by steering the other coverage areas 520*a*-*b* into the avoidance zone 510.

In various embodiments, the network controller 140 may switch between a deferential avoidance scheme 500*a* and an intruding avoidance scheme 500*b* in response to tracking a UE 130 entering or leaving an avoidance zone 510, anticipated network coverage needs (e.g., good/inclement weather for an avoidance zone 510 overlapping outdoor seating), inter-network signaling (e.g., another network controller 140 determining that a second wireless network 120*b* has yielded or is requesting access to the avoidance zone 510), or the like.

Figure 6:
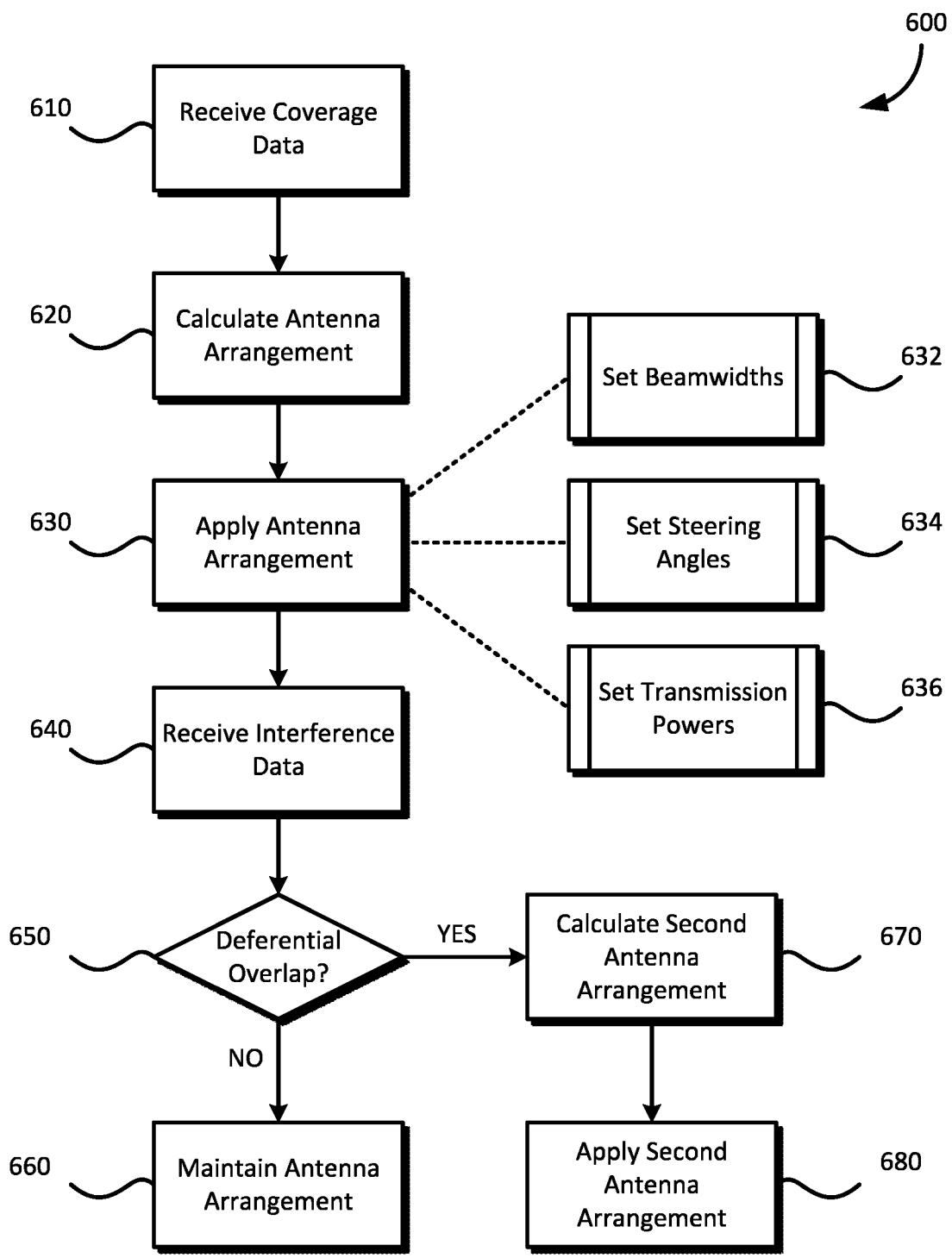
FIG. 6 is a flowchart of a method for enhancing radio resource management with beamwidth selection and beamsteering, according to embodiments of the present disclosure.

FIG. 6 is a flowchart of a method 600 for enhancing radio resource management with beamwidth selection and beamsteering, according to embodiments of the present disclosure. Method 600 begins a block 610, where a network controller 140 receives coverage data for a plurality of APs 110 in a wireless network 120. In various embodiments, to receive the coverage data, the network controller 140 cycles through different potential beamwidths, transmission powers, and steering angles of each AP 110 and sends discovery or probing frames to collect the resulting Received Signal Strength Indicators (RSSIs) for the different combinations.

In various embodiments, the network controller 140 steers the steerable antennas through individual beamwidths and steering options in parallel with one another to explore the different steering angles, but not the different combined coverage alignments for the wireless network 120. For example, if a first antenna and a second antenna are both capable of steering between three angles, the network controller 140 may steer the two antennas to the first angle, the second angle, and the third angle to test all three steering angles rather than steering first antenna through the first through third angles while the second antenna is in the first angle, steering first antenna through the first through third angles while the second antenna is in the second angle, and steering first antenna through the first through third angles while the second antenna is in the third angle.

A block 620, the network controller 140 calculates an antenna arrangement for the various AP 110 using the coverage data. In various embodiments, the network controller 140 calculates an initial antenna arrangement to satisfy various service metrics including, coverage percentage of a designated area 430 (e.g., reduction of unserved area 450), reduction of external areas 440 covered by the network, reduction of total transmission power, and the like. Because some of these service metrics may counteract one another, the network controller 140 can apply various optimization algorithms to calculate an antenna arrangement that is "best" for one metric that is non-optimal for another metric, or may balance the "best" overall solution that prioritizes a combination of two or more metrics where the overall solution is not necessarily the "best" solution for the individual metrics.

In some embodiments, the antenna arrangement is optimized to mitigate coverage holes or unserved areas 450 at the physical edge of the cell (e.g., the periphery of the coverage area) served by an AP 110. In some embodiments, the antenna arrangement is optimized to reduce an overall beamwidth profile or reduce external areas 440 where the signals generated by the APs 110 are observable above a threshold signal strength. The network controller 140, based on the relative locations and proximities of the designated area 430 and neighboring networks, may apply spatial considerations unevenly across the designated area 430 (e.g., prioritizing mitigating coverage holes on one side and reducing overall beamwidth on a second side of the designated area 430). In some embodiments, the antenna arrangement is optimized to reduce an overall transmission power of the APs 110 of the wireless network 120 while maintaining service to existing UEs 130 associated with the APs 110, including setting various APs 110 to standby or disabled modes when not needed to detect incoming UEs 130 or serve existing connections with the UEs 130.

At block 630, the network controller 140 applies the antenna arrangement. In various embodiments, the network controller 140 commands the various APs 110 to select radios and beamwidths, steering angles (if steerable), and transmission powers to match the antenna arrangement calculated per block 620.

For example, when the network controller 140 applies the antenna arrangement via a first AP 110a, a second AP 110b, and a third AP 110c, the network controller 140 may divide the operations of block 630 into several sub-block depending on the capabilities of the individual APs 110 and the antennas selected for use. When the first AP 110a offers a first antenna that provides a fixed coverage range at a first beamwidth and a second antenna that provides a steerable coverage range at a second beamwidth, the network controller 140 may set the beamwidth (per sub-block 632) and the transmission power (per sub-block 636), but omit setting the steering angle when the first antenna is selected. In contrast, when the network controller 140 selects the second antenna (to provide the second beamwidth per sub-block 632), the network controller 140 also sets the steering angle (per sub-block 634) and the transmission power (per sub-block 636). When the second AP 110b offers one antenna that provides a fixed beamwidth that is steerable in the environment, the network controller may omit setting the beamwidth and just set the steering angle (per sub-block 634) and the transmission power (per sub-block 636). When the third AP 110c offers one antenna with both a fixed beamwidth and a fixed steering angle, the network controller may omit setting the beamwidth and steering angle, and just set the transmission power (per sub-block 636).

In various embodiments, the network controller 140 sets the transmission power (per sub-block 636) for each of the APs 110 according to a TPC mechanism (such as the TPC mechanism included in IEEE 802.11). In various embodiments, the network controller 140 defines local rules for maximum uplink or downlink transmission powers to reduce the likelihood or magnitude of interference on neighboring networks, while ensuring good communications between the APs 110 and UE 130. Accordingly, setting a lower transmission power can reduce the area in which a given AP 110 can be heard above a given RSSI, which may reduce the extent of overlapping areas 150. In various embodiments, the TPC mechanism is applied to the UE 130 (in addition to the APs 110) to cap the uplink transmission power used by the UE 130 to reduce the effect of uplink signals on neighboring networks and the UEs 130 served by those networks. When the network controller 140 sets the transmission power, each AP 110 (or UE 130) may use a transmission power up to or below the ideal TPC computed power, which may be below the maximum transmit power that the given device is capable of.

At block 640, the network controller 140 receives interference data from neighboring wireless networks 120, also referred to as OBSS. In various embodiments, the interference data are received as discovery frames or operational signals from the APs 110 of the OBSS that the network controller 140 uses to calculate the effective range of the OBSS and the extent of overlapping areas 150 with the OBSS. In some embodiments, the interference data include the location or border of a designated area 430 served by the OBSS (e.g., the footprint of a neighboring business that offers the OBSS), or a report where the discovery frame or operational signals from the wireless network 120 can be heard by the OBSS or the UEs 130 served thereby.

At block 650, the network controller 140 determines according to the interference data and deference policies for the wireless network 120 whether to apply deferential overlap in response to the interference. For example, even though the OBSS may result in overlapping areas 150 that reduce the bandwidth available to the wireless network 120, if the wireless network 120 is currently serving a UE 130 in that location, or has designated the affected area as a high priority for maintaining network coverage in, the network controller 140 may determine not to act deferentially to the OBSS, and method 600 proceeds to block 660. In various embodiments, the network controller 140 may set a time threshold, an area threshold, a bandwidth threshold or other tolerance thresholds so that overlapping areas 150 below the respective tolerance thresholds are tolerated or ignored as having minimal effect on the wireless network 120, and method 600 proceeds to block 660. However, if the overlapping area 150 induced by the OBSS is above a tolerance threshold (e.g., whose presence is noted over a threshold amount of time, area, bandwidth consumption, or combinations thereof) and the network controller 140 does not have an overriding reason to maintain network coverage in the overlapping area 150 (e.g., an existing connection with a UE 130, a mandate to maintain network coverage in the area), method 600 may proceed to block 670 to update the antenna arrangement to reduce the overlapping area 150 with the OBSS.

At block 660, the network controller 140 maintains the antenna arrangement applied per block 630. In various embodiments, the network controller 140 communicates with an OBSS to identify overlapping area 150 in the coverage between the two networks to coordinate sharing of the overlapping areas 150 or to encourage the other network to reduce an extent of the overlapping areas 150 by yielding some or all of the overlapping areas 150 (at least some of the time) to the wireless network 120.

At block 670, the network controller 140 calculates a second antenna arrangement to reduce an extent of the overlapping areas 150 by yielding some or all of the overlapping areas (at least some of the time) to the OBSS. For example, network controller 140 may set an initial antenna arrangement (per block 630) to produce a coverage range similar to the intruding avoidance scheme 500b in FIG. 5B, and updates the antenna arrangement to produce a coverage range similar to the deferential avoidance scheme 500*a* in FIG. 5A (e.g., with less area falling under the overlapping areas 150).

The network controller 140 uses the coverage data and the interference data to cover the designated area while reducing the effect of network provision in the overlapping areas 150 or the effect of the OBSS on provision of the wireless network 120. For example, to reduce the effect of the signals generated by the APs 110 on the UEs 130 or APs 110 of an OBSS, the network controller 140 calculates an antenna arrangement that reduces the RSSI of the associated network on the OBSS or the OBSS on the associated network.

In various embodiments, the second antenna arrangement is calculated to define an avoidance zone 510 in the designated area 430, where the APs 110 could provide coverage, but are steered or beam formed to avoid providing coverage that would otherwise overlap (causing or receiving interference) with the OBSS according to the interference data. When the APs 110 avoid or minimize the amount of coverage extended into the avoidance zone 510, the two networks may be better spatially isolated, and thus have less signal interference to contend with on shared channels. Stated differently, selective spatial isolation allows two neighboring networks to use the same channels at the same time with less risk of cross-talk or interference. However, as the avoidance zone 510 is part of the designated area 430, the network controller 140 can (when desired) extend coverage back into the avoidance zone 510.

Figure 7:
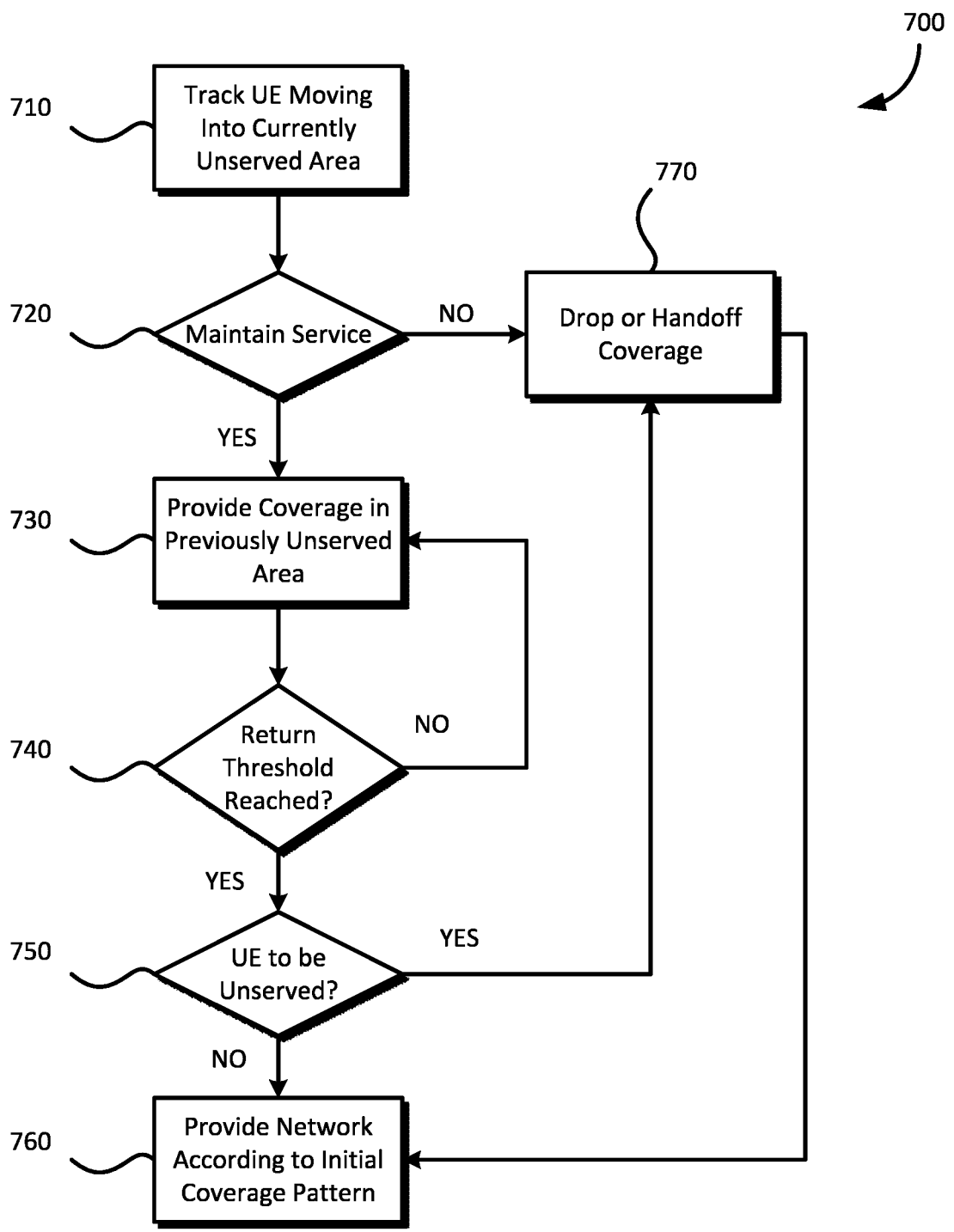
FIG. 7 is a flowchart of a method for enhancing radio resource management with beamwidth selection and beamsteering for handling expansion to or retreat from unserved areas, according to embodiments of the present disclosure.

As is described in greater detail in relation to method 700 in FIG. 7, the network controller 140 may selectively apply one of the first antenna arrangement or the second antenna arrangement to temporarily extend coverage into the avoidance zone 510 or retract coverage from the avoidance zone 510 to help reduce cross-network interference or resource contention, while allowing the APs 110 to remain in static physical locations.

At block 680, the network controller 140 applies the second antenna arrangement. In various embodiments, the network controller 140 commands the various APs 110 to select radios and beamwidths, steering angles (if steerable), and transmission powers to match the antenna arrangement calculated per block 670.

FIG. 7 is a flowchart of a method 700 for enhancing radio resource management with beamwidth selection and beam-steering for handling expansion to or retreat from unserved areas 450, according to embodiments of the present disclosure. Method begins at block 710, where the network controller 140 tracks, observes, or is otherwise alerted that a UE 130 served by the APs 110 of a wireless network 120 is moving into a currently unserved area 450, such as an avoidance zone 510. In various embodiments, the network controller 140 identifies the unserved areas 450 based on where the current coverage pattern for the APs 110 does not overlap with the designated area 430 for the wireless network 120 to cover.

At block 720, the network controller 140 determines whether to maintain service for the connection with the UE 130 moving into the unserved area 450. The network controller 140 determines whether the unserved area 450 could be served by steering the coverage area of one or more APs 110 into the unserved area 450, changing the beamwidth of one or more APs 110, or combinations thereof. Additionally or alternatively, the network controller 140 determines whether changing the coverage area of the wireless network 120 would be an efficient use of network resources. For example, if continuing to serve a given UE 130 moving into the currently unserved area 450 would deprive several other UEs 130 of network coverage, the network controller 140 can determine not to maintain service for the given UE 130. Accordingly, when the network controller 140 determines to maintain service, method 700 proceeds to block 730, and when the network controller 140 demines not to maintain service, method 700 proceeds to block 770.

At block 730, the network controller 140 adjusts the coverage area of one or more APs 110 to provide coverage in the previously unserved area 450. In various embodiments, the network controller 140 steers the coverage area of one or more APs 110 to different locations in the environment, changes a beamwidth of one or more APs 110 to expand in an additional location in the environment, or combinations thereof. The choice of which AP 110 to change the coverage area of may be based on the available antenna configurations of the given AP 110 serving the UE 130, the available antenna configurations of other APs 110 in the wireless network 120 (e.g., to compensate for areas that are no longer served by the given AP 110), and an impact on the wireless network 120 or OBSS based on any new overlapping areas between the neighboring networks.

At block 740, the network controller 140 determines whether a return threshold has been reached. In various embodiments, the network controller 140 may determine to return to an initial network coverage pattern (e.g., the antenna arrangement used in or prior to block 710) to avoid providing service in an avoidance area 510 beyond a given time period, when a UE 130 leaves the previously unserved area 450 (or no longer requests network service), when a greater number of UE 130 in another location require use of the AP 110 serving the UE 130 provided with coverage in the previously unserved area 450, or the like. So long as the return threshold is not reached, method 700 may continue providing coverage in the previously unserved area 450 and cycle through block 730 and block 740.

When the return threshold is reached, method 700 proceeds to block 750, where the network controller 140 determines whether the UE 130 remains located in an area that will be an unserved area 450. When the UE 130 is located in an area that will be an unserved area 450, method 700 proceeds to block 770 to drop or handoff the UE 130 to another network before returning to the initial coverage pattern. Otherwise, if the UE 130 is not in an area that will be unserved (e.g., the UE 130 has already handed off to another network or is within a coverage area of the initial coverage pattern), method 700 proceeds to block 760.

At block 760, the network controller 140 controls the antennas of the APs 110 to provide the wireless network 120 according to the initial coverage pattern. In various embodiments, the APs 110 maintain the initial coverage pattern (e.g., after determining at block 720 to not maintain service as the UE 130 moves into an unserved area 450) or return to the initial coverage pattern (e.g., after determining at block 720 to adjust the coverage pattern of the wireless network 120 to maintain service as the UE 130 moves into an unserved area 450). Method 700 may then conclude.

At block 770, the network controller 140 attempts to handoff coverage of the UE 130 to another network, or absent coverage from a neighboring network that the UE 130 can handoff to, the network controller 140 instructs or allows the APs 110 to drop association with the UE 130 as the UE 130 leaves the coverage range of the APs 110. Method 700 proceeds to block 760 from block 770.

Figure 8:
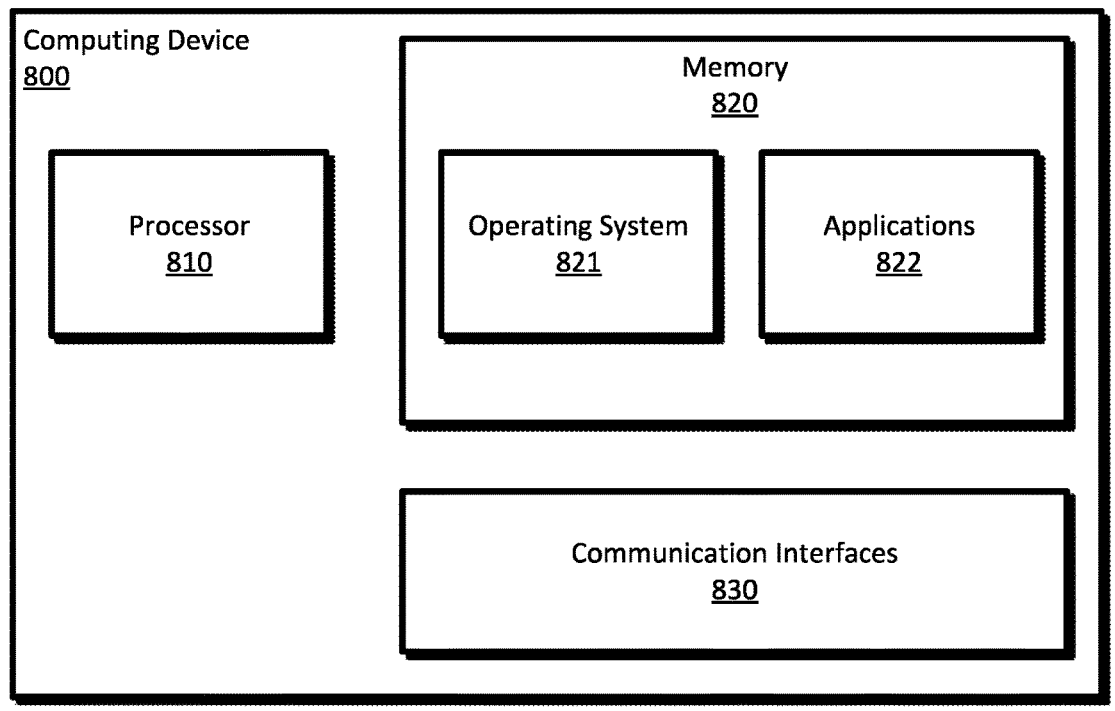
FIG. 8 illustrates hardware of a computing device, according to embodiments of the present disclosure.

FIG. 8 illustrates hardware of a computing device 800 such as can be included in an AP 110, a UE 130, or a network controller 140 as described herein. The computing device 800 includes a processor 810, a memory 820, and communication interfaces 830. The processor 810 may be any processing element capable of performing the functions described herein. The processor 810 represents a single processor, multiple processors, a processor with multiple cores, and combinations thereof. The communication interfaces 830 facilitate communications between the computing device 800 and other devices. The communication interfaces 830 are representative of wireless communications antennas (both omnidirectional and directional), various steering mechanisms for the antennas, and various wired communication ports including out-pins and in-pins to a microcontroller. The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives.

As shown, the memory 820 includes various instructions that are executable by the processor 810 to provide an operating system 821 to manage various functions of the computing device 800 and one or more applications 822 to provide various functionalities to users of the computing device 800, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving coverage data for a plurality of Access Points (APs) in a wireless network;
   calculating an antenna arrangement for the plurality of APs based on the coverage data, wherein the antenna arrangement covers a designated area in a network environment; and
   configuring each AP of the plurality of APs according to the antenna arrangement by:
      setting a steering angle for adjustable antennas of the plurality of APs;
      setting a transmission power for the adjustable antennas; and
      setting a beamwidth of the adjustable antennas.

2. The method of claim 1, further comprising:
   receiving interference data from an Overlapping Basic Service Set (OBSS) to the wireless network;
   calculating a second antenna arrangement for the plurality of APs based on the coverage data and the interference data to cover the designated area and reduce Received Signal Strength Indicators (RSSIs) in the OBSS; and
   configuring each AP of the plurality of APs according to the second antenna arrangement, wherein the plurality of APs remain physically located at respective positions in the network environment when configured according to the antenna arrangement and the second antenna arrangement.

3. The method of claim 1, wherein the designated area defines an avoidance zone, where the plurality of APs does not provide coverage according to the antenna arrangement, the method further comprising:
   in response to tracking a User Equipment (UE) entering the avoidance zone:
      calculating a second antenna arrangement for the plurality of APs to provide coverage in the avoidance zone;
      configuring each AP of the plurality of APs according to the second antenna arrangement, wherein the plurality of APs remain physically located at respective positions in the network environment when configured according to the antenna arrangement and the second antenna arrangement; and
   in response to tracking the UE leaving the avoidance zone, configuring each AP of the plurality of APs according to the antenna arrangement.

4. The method of claim 1, wherein receiving the coverage data includes cycling through different combinations of beamwidths, transmission powers, and steering angles for the plurality of APs and collecting Received Signal Strength Indicators (RSSIs) for the different combinations.

5. The method of claim 1, wherein the antenna arrangement is calculated to mitigate unserved area to increase coverage for User Equipment (UE) at a physical edge of a cell served by an individual AP of the plurality of APs.

6. The method of claim 1, wherein the antenna arrangement is calculated to reduce an overall transmission power of the wireless network while serving existing User Equipment (UE) associated with the plurality of APs.

7. The method of claim 1, wherein the antenna arrangement is calculated to reduce an overall beamwidth profile while serving existing User Equipment (UE) associated with an individual AP of the plurality of APs.

8. A system, comprising:
   a processor; and
   a memory storing instructions that when executed by the processor cause the processor to perform operations comprising:
      receiving coverage data for a plurality of Access Points (APs) in a wireless network;
      calculating an antenna arrangement for the plurality of APs based on the coverage data, wherein the antenna arrangement covers a designated area in a network environment; and
      configuring each AP of the plurality of APs according to the antenna arrangement by:
         setting a steering angle for adjustable antennas of the plurality of APs;
         setting a transmission power for the adjustable antennas; and
         setting a beamwidth of the adjustable antennas.

9. The system of claim 8, wherein the operations further comprise:
   receiving interference data from an Overlapping Basic Service Set (OBSS) to the wireless network;
   calculating a second antenna arrangement for the plurality of APs based on the coverage data and the interference data to cover the designated area and reduce Received Signal Strength Indicators (RSSIs) in the OBSS; and
   configuring each AP of the plurality of APs according to the second antenna arrangement, wherein the plurality of APs remain physically located at respective positions in the network environment when configured according to the antenna arrangement and the second antenna arrangement.

10. The system of claim 8, wherein the designated area defines an avoidance zone, where the plurality of APs does not provide coverage according to the antenna arrangement, the operations further comprising:
    in response to tracking a User Equipment (UE) entering the avoidance zone:
       calculating a second antenna arrangement for the plurality of APs to provide coverage in the avoidance zone;
       configuring each AP of the plurality of APs according to the second antenna arrangement, wherein the plurality of APs remain physically located at respective positions in the network environment when configured according to the antenna arrangement and the second antenna arrangement; and
    in response to tracking the UE leaving the avoidance zone, configuring each AP of the plurality of APs according to the antenna arrangement.

11. The system of claim 8, wherein receiving the coverage data includes cycling through different combinations of beamwidths, transmission powers, and steering angles for the plurality of APs and collecting Received Signal Strength Indicators (RSSIs) for the different combinations.

12. The system of claim 8, wherein the antenna arrangement is calculated to mitigate unserved area to increase coverage for User Equipment (UE) at a physical edge of a cell served by an individual AP of the plurality of APs.

13. The system of claim 8, wherein the antenna arrangement is calculated to reduce an overall transmission power of the wireless network while serving existing User Equipment (UE) associated with the plurality of APs.

14. The system of claim 8, wherein the antenna arrangement is calculated to reduce an overall beamwidth profile while serving existing User Equipment (UE) associated with an individual AP of the plurality of APs.

15. A non-transitory computer readable storage medium including instructions that when executed by a processor cause the processor to perform operations comprising:
- receiving coverage data for a plurality of Access Points (APs) in a wireless network;
- calculating an antenna arrangement for the plurality of APs based on the coverage data, wherein the antenna arrangement covers a designated area in a network environment; and
- configuring each AP of the plurality of APs according to the antenna arrangement by:
  - setting a steering angle for adjustable antennas of the plurality of APs;
  - setting a transmission power for the adjustable antennas; and
  - setting a beamwidth of the adjustable antennas.

16. The computer readable storage medium of claim 15, wherein the operations further comprise:
- receiving interference data from an Overlapping Basic Service Set (OBSS) to the wireless network;
- calculating a second antenna arrangement for the plurality of APs based on the coverage data and the interference data to cover the designated area and reduce Received Signal Strength Indicators (RSSIs) in the OBSS; and
- configuring each AP of the plurality of APs according to the second antenna arrangement, wherein the plurality of APs remain physically located at respective positions in the network environment when configured according to the antenna arrangement and the second antenna arrangement.

17. The computer readable storage medium of claim 15, wherein the designated area defines an avoidance zone, where the plurality of APs does not provide coverage according to the antenna arrangement, the operations further comprise:
- in response to tracking a User Equipment (UE) entering the avoidance zone:
  - calculating a second antenna arrangement for the plurality of APs to provide coverage in the avoidance zone;
  - configuring each AP of the plurality of APs according to the second antenna arrangement, wherein the plurality of APs remain physically located at respective positions in the network environment when configured according to the antenna arrangement and the second antenna arrangement; and
- in response to tracking the UE leaving the avoidance zone, configuring each AP of the plurality of APs according to the antenna arrangement.

18. The computer readable storage medium of claim 15, wherein receiving the coverage data includes cycling through different combinations of beamwidths, transmission powers, and steering angles for the plurality of APs and collecting Received Signal Strength Indicators (RSSIs) for the different combinations.

19. The computer readable storage medium of claim 15, wherein the antenna arrangement is calculated to mitigate unserved area to increase coverage for User Equipment (UE) at a physical edge of a cell served by an individual AP of the plurality of APs.

20. The computer readable storage medium of claim 15, wherein the antenna arrangement is calculated to reduce an overall transmission power of the wireless network while serving existing User Equipment (UE) associated with the plurality of APs.

* * * * *

UNITED STATES PATENT AND TRADEMARK OFFICE
CERTIFICATE OF CORRECTION

PATENT NO. : 11,791,868 B2
APPLICATION NO. : 17/451527
DATED : October 17, 2023
INVENTOR(S) : Santosh B. Kulkarni et al.

It is certified that error appears in the above-identified patent and that said Letters Patent is hereby corrected as shown below:

On the Title Page

In item (57), in Column 2, in "Abstract", Line 7, delete "aps" and insert -- APs --.

In the Specification

In Column 14, Line 5, delete "demines" and insert -- determines --.

Signed and Sealed this
Twentieth Day of August, 2024

Katherine Kelly Vidal
*Director of the United States Patent and Trademark Office*